US009917939B1

(12) United States Patent
Stimpson et al.

(10) Patent No.: US 9,917,939 B1
(45) Date of Patent: Mar. 13, 2018

(54) AUTOMATICALLY DELAYING PLAYBACK OF A VOICE MESSAGE AT A CAPTIONING DEVICE

(71) Applicant: Sorenson IP Holdings, LLC, Salt Lake City, UT (US)

(72) Inventors: Michael Stimpson, Taylorsville, UT (US); Brian Chevrier, Highland, UT (US); Jennifer Mitchell, Lehi, UT (US)

(73) Assignee: SORENSON IP HOLDINGS, LLC, Salt Lake City, UT (US)

( * ) Notice: Subject to any disclaimer, the term of this patent is extended or adjusted under 35 U.S.C. 154(b) by 0 days.

(21) Appl. No.: 15/446,767

(22) Filed: Mar. 1, 2017

(51) Int. Cl.
*H04M 11/00* (2006.01)
*H04M 1/247* (2006.01)
*H04M 1/65* (2006.01)
*H04M 3/42* (2006.01)

(52) U.S. Cl.
CPC ....... *H04M 1/2475* (2013.01); *H04M 1/2477* (2013.01); *H04M 1/6505* (2013.01); *H04M 3/42391* (2013.01); *H04M 2203/252* (2013.01); *H04M 2203/305* (2013.01); *H04M 2250/22* (2013.01)

(58) Field of Classification Search
CPC ......... H04M 1/72525; H04M 1/72591; H04M 11/066; H04M 3/42382; H04M 3/42391; H04M 15/06; H04M 15/41; H04N 5/278; H04N 7/141
USPC ..................................... 379/52, 67.1, 68, 70
See application file for complete search history.

(56) References Cited

U.S. PATENT DOCUMENTS

| 5,909,482 | A | 6/1999 | Engelke |
| 6,775,651 | B1 | 8/2004 | Lewis et al. |
| 8,010,366 | B1* | 8/2011 | Kearby ................ G09B 21/006 704/271 |
| 8,259,910 | B2* | 9/2012 | Afifi ..................... H04M 3/5232 379/88.14 |
| 9,131,045 | B2* | 9/2015 | Engleke ................. G10L 15/26 |
| 9,374,536 | B1* | 6/2016 | Nola |
| 2002/0069067 | A1* | 6/2002 | Klinefelter ............. G06Q 10/10 704/270.1 |
| 2007/0058681 | A1* | 3/2007 | Bettis ...................... H04L 47/10 370/493 |
| 2007/0165824 | A1* | 7/2007 | Gerritse-Van Bavel ............... H04M 3/42229 379/218.01 |

(Continued)

FOREIGN PATENT DOCUMENTS

| CN | 102447782 A | 10/2011 |
| KR | 20080003494 A | 1/2008 |

OTHER PUBLICATIONS

"CaptionCall: Life is Calling, User Guide" 2015, 141 pages.

*Primary Examiner* — Binh Kien Tieu
(74) *Attorney, Agent, or Firm* — Maschoff Brennan

(57) ABSTRACT

A method for automatically delaying playback of a voice message at a captioning device may include receiving, at a captioning device, a request from a user to play back a voice message that is stored on the captioning device. The method may also include, in response to the request from the user, automatically delaying the playback of the voice message, at the captioning device, until an establishment of a connection between the captioning device and a remote call assistant, in order to allow the remote call assistant to caption on the captioning device, in real-time, the voice message from the very beginning of the playback of the voice message.

20 Claims, 6 Drawing Sheets

(56) References Cited

U.S. PATENT DOCUMENTS

| | | | |
|---|---|---|---|
| 2008/0187108 A1* | 8/2008 | Engelke | G10L 15/265 |
| | | | 379/52 |
| 2010/0323728 A1 | 12/2010 | Gould et al. | |
| 2013/0308763 A1* | 11/2013 | Engelke | H04M 11/066 |
| | | | 379/52 |
| 2016/0036984 A1 | 2/2016 | Chang et al. | |
| 2016/0105554 A1* | 4/2016 | Engelke | H04M 11/066 |
| | | | 379/52 |
| 2016/0163317 A1 | 6/2016 | Zetterberg | |
| 2017/0181033 A1* | 6/2017 | Jones | H04W 28/06 |

* cited by examiner

AUTOMATICALLY DELAYING PLAYBACK OF A VOICE MESSAGE AT A CAPTIONING DEVICE

FIELD

The embodiments discussed herein are related to automatically delaying playback of a voice message at a captioning device.

BACKGROUND

Telephone answering machines have long been employed to answer telephone calls and record voice messages locally to a user. More recently, voicemail systems have been employed to answer telephone calls and store voice messages remotely from a user. Voice messages are generally useful because they can be stored while a user is not available and then be listened to at a time that is more convenient for the user.

However, voice messages are less useful for a hearing-impaired user because it may be difficult or impossible for the hearing-impaired user to understand the content of a voice message by simply listening to the voice message.

The subject matter claimed herein is not limited to embodiments that solve any disadvantages or that operate only in environments such as those described above. Rather, this background is only provided to illustrate one example technology area where some embodiments described herein may be practiced.

SUMMARY

A method for automatically delaying playback of a voice message at a captioning device may include receiving, at a captioning device, a request from a user to play back a voice message that is stored on the captioning device. The method may also include, in response to the request from the user, automatically delaying the playback of the voice message, at the captioning device, until an establishment of a connection between the captioning device and a remote call assistant, in order to allow the remote call assistant to caption on the captioning device, in real-time, the voice message from the very beginning of the playback of the voice message.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
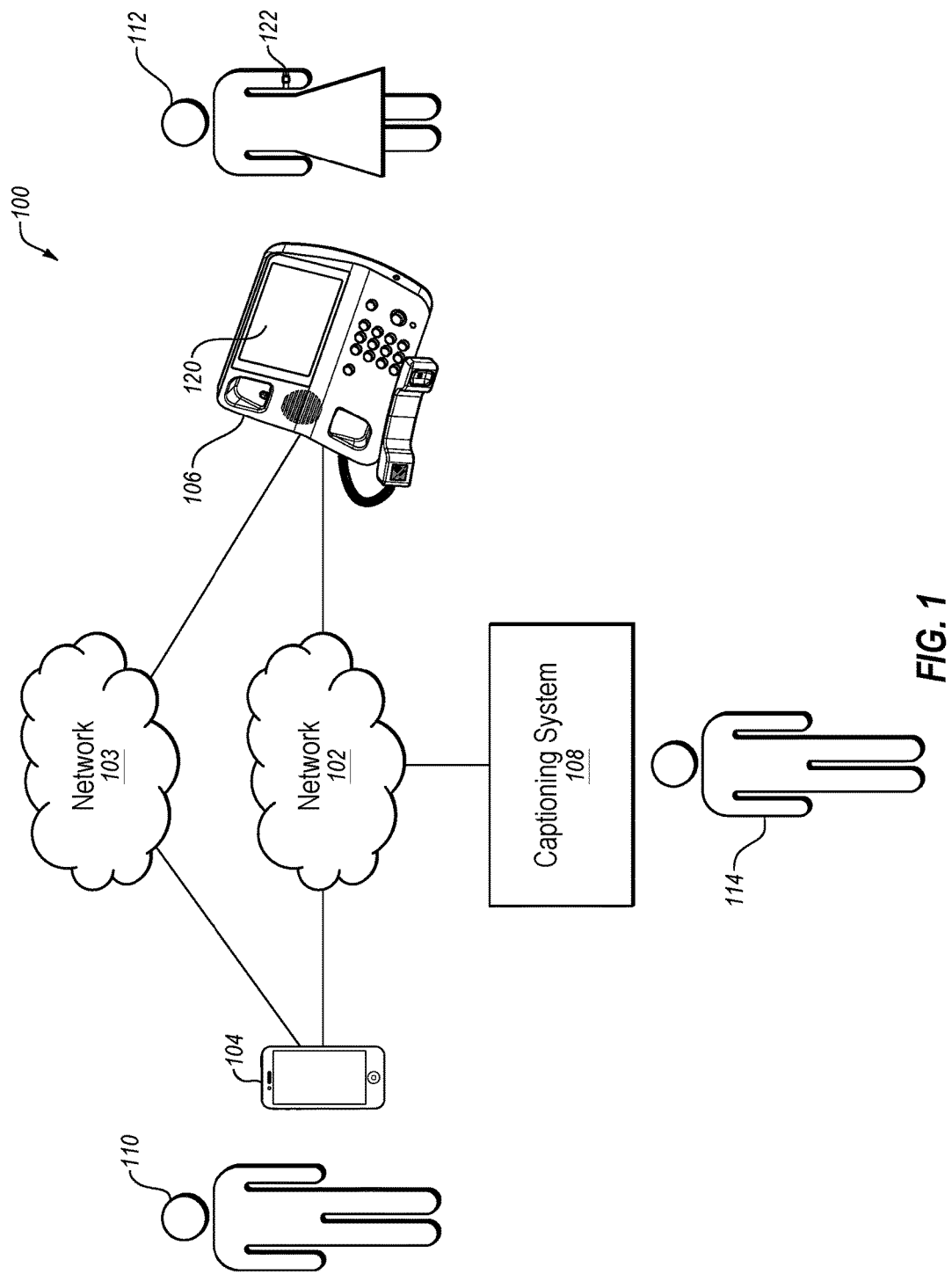
FIG. 1 illustrates an example communication system configured to automatically delay playback of a voice message at a captioning device.

Some embodiments in this disclosure relate to devices and methods that may be configured to automatically delay playback of a voice message at a captioning device.

It may be difficult or impossible for a hearing-impaired user to understand the content of a voice message by simply listening to the voice message. In order for a voice message to be useful to a hearing-impaired user, the voice message may need to be converted into another format by a remote service that caters to hearing-impaired users. While voice messages that are stored remotely on voicemail systems may be easily accessible to remote services that cater to hearing-impaired users, voice messages that are stored on a telephone answering machine that is local to a hearing-impaired user may be inaccessible to remote services that cater to hearing-impaired users. Therefore, a hearing-impaired user may employ a remote captioning service to provide captioning on a local captioning device of the voice message. This remote captioning service may be provided during a captioning session by a remote call assistant who listens to the voice message and provides captioning of the voice message to the hearing-impaired user on a display of the local captioning device.

One problem with the captioning of a voice message that is stored locally at a local captioning device is that the remote call assistant may not have access to the voice message prior to the beginning of an actual captioning session in which the local captioning device is connected to the remote call assistant. Further, since the establishment of a captioning session may take longer than the amount of time it takes to begin playing a locally-stored voice message, the beginning portion of the voice message may have already played prior to the remote call assistant being connected to the local captioning device, resulting in the beginning portion of voice message being missing from the captioning provided by the remote call assistant.

For example, a five-second voice message may consist of the following spoken words: "Hi Mom. I'm calling from a pay phone on my way to Bill's house. Call me there when you get this message," with the beginning three seconds of the voice message consisting of the spoken words "Hi Mom. I'm calling from a pay phone on my way to Bill's house," and the final two seconds of the voice message consisting of the spoken words "Call me there when you get this message." If a hearing-impaired user plays this five-second voice message on a local captioning device with a request that the voice message be captioned, it may take three seconds for a call assistant to be connected to the captioning device, resulting in the remote call assistant missing the playback of the beginning three seconds of the voice message. Thus, the beginning three seconds of the voice message would be missing from the captioning provided by the remote call assistant, leaving only the incomplete final two seconds of the voice message being present in the captioning. In this example, the beginning three seconds being missing from the captioning may result in the hearing-impaired user not knowing who called (her child), where they called from (a pay phone), where they are going to (Bill's house), or where to call them back at (Bill's house). Furthermore, as the voice message is not a real-time conversation with the caller leaving the message, the hearing-impaired user does not have an opportunity to clarify any misunderstanding with the caller. Therefore, since important information may only be present in the beginning portion of a voice message, the inability of a remote call assistant to caption, in real-time, the beginning portion due to the delay in setting up the captioning session may result in a hearing-impaired user missing out on important information during the captioning of a locally-stored voice message. As used herein, the term "real-time captioning" refers to real-time processing of an audio signal and converting the audio signal into captioning. It is understood, especially in the case of a human call assistant, that real-time captioning may involve some delay caused by the time it takes to listen to the audio, convert that audio to captioning, and then send that captioning to a visual display, which may result in a delay of up to a few seconds between the time the audio is heard and the captioning of the audio is displayed to a hearing-impaired user.

The devices and methods disclosed herein may provide various benefits. In particular, the devices and methods disclosed herein may, for example, automatically delay the playback of a voice message at a captioning device until an establishment of a connection between the captioning device and a remote call assistant, in order to allow the remote call assistant to caption, in real-time, the voice message on a display of the captioning device from the very beginning of the playback of the voice message. Alternatively, the devices or methods disclosed herein may, for example, automatically delay the playback of the voice message at the captioning device until the earlier of the establishment of the connection between the captioning device and the remote call assistant or an expiration of a particular time period even if no connection is established between the captioning device and the remote call assistant, in order to avoid delaying the playback of the voice message longer than the particular time period. In this manner, the captioning for a hearing-impaired user may avoid missing information contained in the beginning portion of the voice message.

Continuing with the example noted above, the devices and methods disclosed herein may enable the beginning three seconds (consisting of "Hi Mom. I'm calling from a pay phone on my way to Bill's house") of the five-second voice message to be captioned, even where it takes three seconds for the captioning session to begin after the hearing-impaired user requests playback of the voice message, thus enabling the hearing-impaired user to know who called (her child), where they called from (a pay phone), where they are going to (Bill's house), and where to call them back at (Bill's house).

Turning to the figures, FIG. 1 illustrates an example communication system 100 configured to automatically delay playback of a voice message at a captioning device. The system 100 may be arranged in accordance with at least one embodiment described in the present disclosure. The system 100 may include a network 102, a network 103, a device 104, a captioning device 106, and a captioning system 108.

The network 103 may be configured to communicatively couple the device 104 and the captioning device 106, and the network 104 may be configured to communicatively couple the captioning device 106 and the captioning system 108. In some embodiments, the networks 102 and 103 may each be any network or configuration of networks configured to send and receive communications between systems and devices. In some embodiments, the network 102 may include a conventional type network, a wired or wireless network, and may have numerous different configurations. In some embodiments, the network 103 may also be coupled to or may include portions of a telecommunications network, including telephone lines, for sending data in a variety of different communication protocols, such as a plain old telephone system (POTS). In some embodiments, the networks 102 and 103 may be the same network, such as in the case of a Voice Over IP (VoIP) environment, or the networks 102 and 103 may be carried by the same infrastructure, such as where a POTS call is carried, for at least for part of the distance, by the same fiber cables that carry internet traffic or by transmission on a cell network.

Each of the devices 104 and 106 may be any electronic or digital computing device. For example, each of the devices 104 and 106 may include a desktop computer, a laptop computer, a smartphone, a mobile phone, a tablet computer, a telephone, a phone console, a captioning device, a captioning telephone, or any other computing device. In some embodiments, each of the devices 104 and 106 may be configured to establish communication sessions with other devices. For example, each of the devices 104 and 106 may be configured to establish an outgoing telephone call with another device over a telephone line or network. For example, the devices 104 and 106 may communicate over a wireless cellular network or a POTS line. Alternatively or additionally, the devices 104 and 106 may communicate over other wired or wireless networks that do not include or only partially include a POTS. For example, a telephone call or communication session between the devices 104 and 106 may be a voice-over internet protocol (VOIP) telephone call. As another example, the communication session between the devices 104 and 106 may be a video communication session or other communication session.

Alternately or additionally, each of the devices 104 and 106 may be configured to communicate with other systems over a network, such as the network 102 or another network. In these and other embodiments, the devices 104 and 106 may receive data from and send data to the captioning system 108. For example, the devices 104 and 106 may include memory and at least one processor, which are configured to perform operations as described in this disclosure, among other operations. In some embodiments, the devices 104 and 106 may include computer-readable instructions that are configured to be executed by the devices 104 and 106 to perform operations described in this disclosure.

In some embodiments, the captioning system 108 may include any configuration of hardware, such as processors, servers, and database servers that are networked together and configured to perform a task. For example, the captioning system 108 may include multiple computing systems, such as multiple servers that each include memory and at least one processor, which are networked together and configured to perform operations of captioning communication sessions, such as telephone calls, between devices such as the captioning device 106 and another device as described in this disclosure. In these and other embodiments, the captioning system 108 may operate to caption audio generated by one or more parties in the communication session. For example, the captioning system 108 may caption audio generated by other devices and not the captioning device 106 or both the captioning device 106 and other devices, among other configurations.

In some embodiments, the captioning system 108 may operate as an exchange configured to establish communication sessions, such as telephone calls, video calls, etc. between devices such as the captioning device 106 and another device or devices as described in this disclosure, among other operations. In some embodiments, the captioning system 108 may include computer-readable instructions that are configured to be executed by the captioning system 108 to perform operations described in this disclosure.

Further, in some embodiments, the system 100 may be configured to facilitate an assisted communication session between a hearing-impaired user 112 and a second user, such as a user 110. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, the assisted communication session may be established between a device such as the device 104 and the captioning device 106. In these embodiments, the captioning device 106 may be configured to present captions of the communication session to the hearing-impaired user 112, such as one of the CaptionCall® 57T model family or 67T model family of captioning telephones or a device running the CaptionCall® mobile app. For example, in some embodiments, the captioning device 106 may include a visual display 120, such as a touchscreen visual display or other visual display, that is integral with the captioning device 106 and that is configured to present text captions of a communication session to the hearing-impaired user 112.

Alternatively or additionally, the captioning device 106 may be associated with a visual display that is physically separate from the captioning device 106 and that is in wireless communication with the captioning device 106, such as a visual display of a wearable device 122 worn on the wrist of the hearing-impaired user 112 and configured to be in BlueTooth® wireless communication with the captioning device 106. Other physically separate physical displays may be visual displays of desktop computers, laptop computers, smartphones, mobile phones, tablet computers, or any other computing devices that are in wireless communication with the captioning device 106.

The captioning device 106 may also include a speaker (not shown), such as a speaker in a handset or a speaker in a speakerphone. The captioning device 106 may also include a processor communicatively coupled to the visual display 120 and to the speaker, as well as at least one non-transitory computer-readable media communicatively coupled to the processor and configured to store one or more instructions that when executed by the processor perform the methods for automatically delaying playback of a voice message disclosed herein, and also store voice messages locally on the captioning device 106.

During a captioning communication session, the captioning system 108, the device 104, and the captioning device 106 may be communicatively coupled using networking protocols. In some embodiments, during the communication session between the device 104 and the captioning device 106, the captioning device 106 may provide the audio signal from the device 104 to the captioning system 108.

At the captioning system 108, the audio signal may be transcribed. In some embodiments, to transcribe the audio signal, a remote call assistant 114 may listen to the audio signal received from the device 104, via the device 106, and "revoice" the words of the user 110 to a speech recognition computer program tuned to the voice of the remote call assistant 114. In these and other embodiments, the remote call assistant 114 may be an operator who serves as a human intermediary between the hearing-impaired user 112 and the user 110. In some embodiments, text captions may be generated by a speech recognition computer as a transcription of the audio signal of the user 110. The text captions may be provided to the captioning device 106 being used by the hearing-impaired user 112 over the network 102. The captioning device 106 may display the text captions on the visual display 120 while the hearing-impaired user 112 carries on a normal conversation with the user 110. The text captions may allow the hearing-impaired user 112 to supplement the voice signal received from the device 104 and confirm her understanding of the words spoken by the user 110.

In addition to captioning communication sessions, the system 100 may be configured to provide captioning of voice messages that are stored locally on the captioning device 106, known as a captioning voice message session. For example, the captioning device 106 may be configured to function both as a captioning device as well as function as a local "answering machine" in which the user 110 calling using the device 104 may leave a voice message on the captioning device 106 when a call to the captioning device 106 goes unanswered by the hearing-impaired user 112. Later, the hearing-impaired user 112 may employ the captioning device 106 to play back the voice message with real-time captioning of the voice message provided by the remote call assistant 114.

During a captioning voice message session, the captioning system 108 and the captioning device 106 may be communicatively coupled using networking protocols. In some embodiments, during the captioning voice message session, the captioning device 106 may provide an audio signal from a locally-stored voice message to the captioning system 108.

At the captioning system 108, the audio signal from the voice message may be transcribed into text captions by the remote call assistant 114 in a manner similar to the transcribing performed during a captioning communication session. The text captions may then be provided to the captioning device 106 being used by the hearing-impaired user 112 over the network 102. The captioning device 106 may display the text captions on the visual display 120, in real-time, while the hearing-impaired user 112 listens to the voice message on a speaker of the captioning device 106. The text captions may allow the hearing-impaired user 112 to supplement the audible playback of the voice message on the captioning device 106 and confirm her understanding of the words spoken in the voice message. As noted previously, the captioning device 106 may be configured to automatically delay the playback of the voice message until an establishment of a connection between the captioning device 106 and the remote call assistant 114 in order to allow the remote call assistant 114 to caption, in real-time, the voice message on the visual display 120 of the captioning device 106 from the very beginning of the playback of the voice message.

Modifications, additions, or omissions may be made to the system 100 without departing from the scope of the present disclosure. For example, in some embodiments, the user 110 may also be hearing-impaired. In these and other embodiments, the captioning system 108 may provide text captions to the device 104 based on audio data transmitted by the captioning device 106. Alternately or additionally, the captioning system 108 may include additional functionality. For example, the captioning system 108 may edit the text captions or make other alterations to the text captions after presentation of the text captions on the captioning device 106. Alternately or additionally, in some embodiments, the system 100 may include additional devices similar to the devices 104 and 106. In these and other embodiments, the similar devices may be configured to automatically delay playback of a voice message.

Figure 2A:
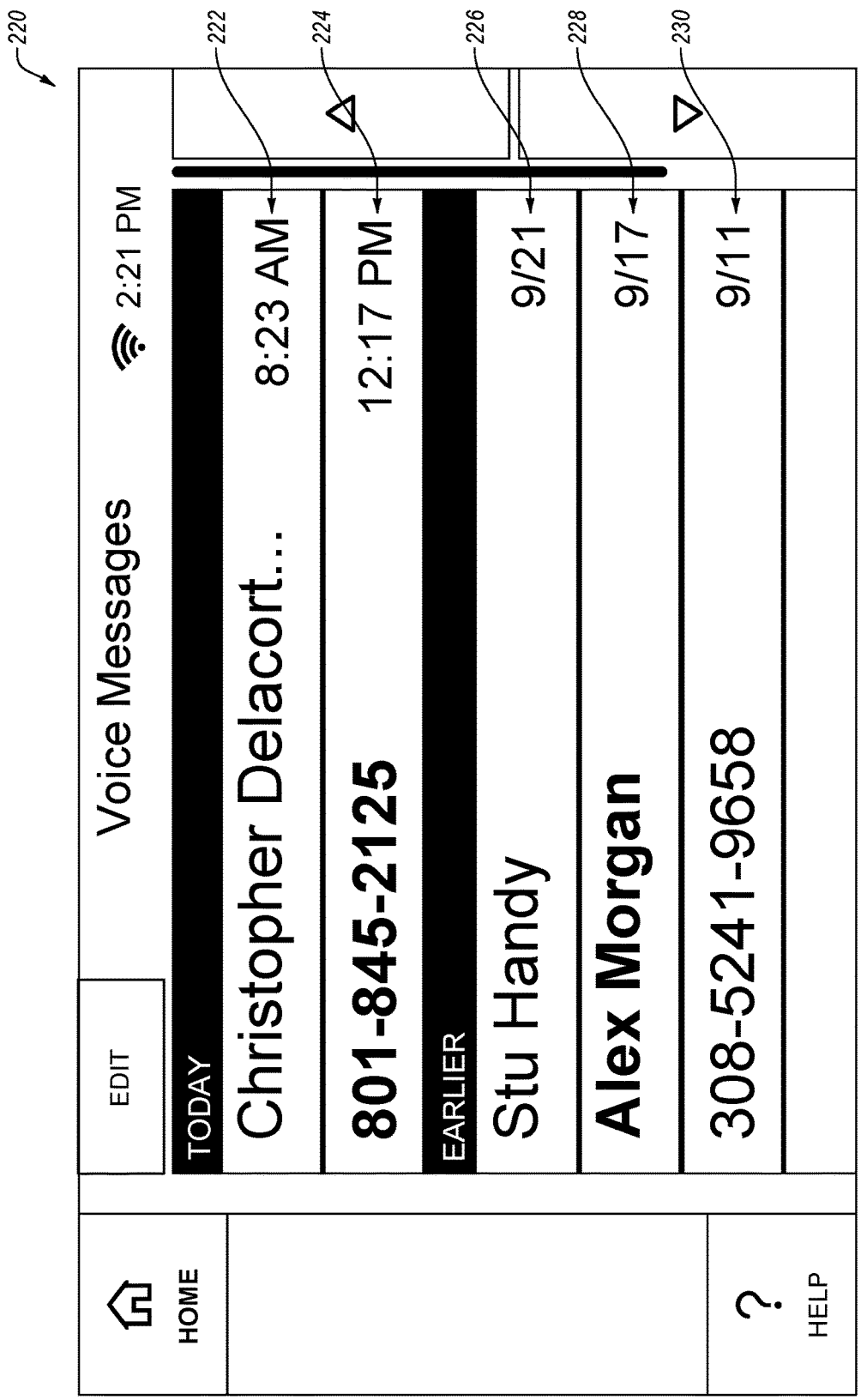
FIGS. 2A, 2B, and 2C illustrate example screens that may appear on a display of a captioning device while the captioning device is automatically delaying playback of a voice message.
Figure 2B:
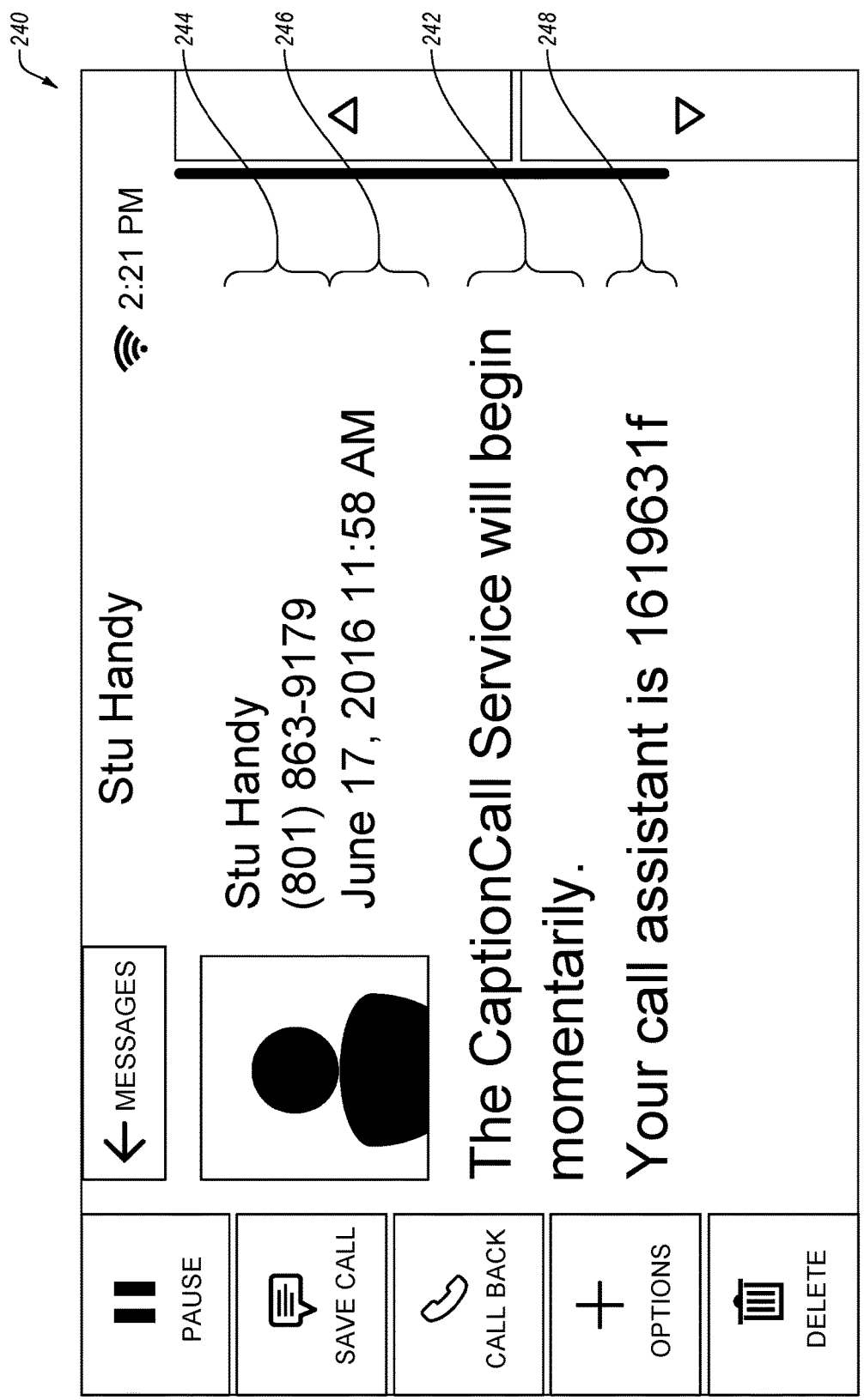
Figure 2C:
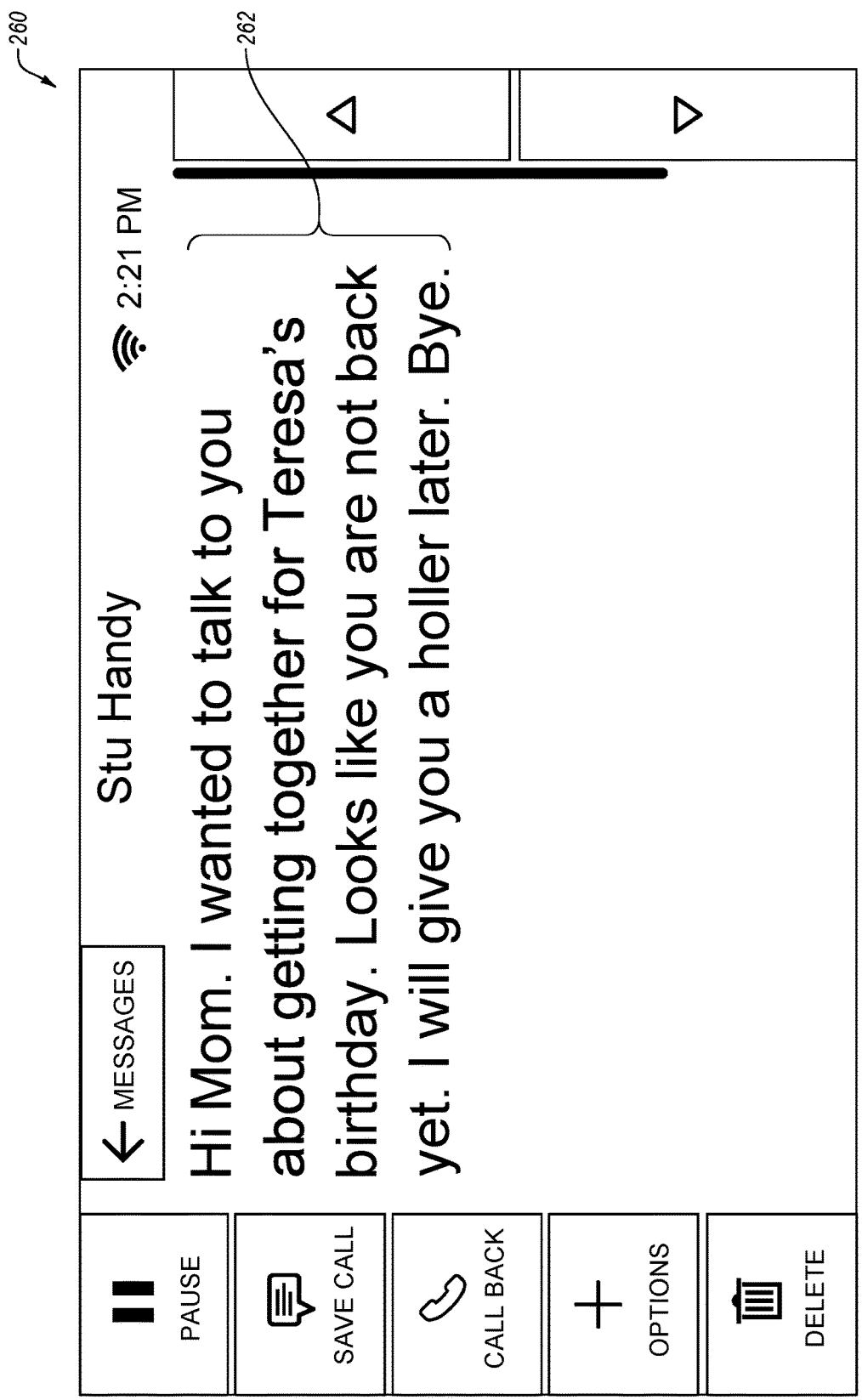

FIGS. 2A, 2B, and 2C illustrate example screens 220, 240, and 260 that may appear on the visual display 120 of the captioning device 106 of FIG. 1 while the device is automatically delaying playback of a voice message, arranged in accordance with at least one embodiment described in the present disclosure.

The screen 220 of FIG. 2A displays voice messages 222, 224, 226, 228, and 230 that are stored locally on the captioning device 106 of FIG. 1. The voice messages 224 and 230 are designated by the phone number of the caller who left the voice message, while the voice messages 222, 226, and 228 are designated by the caller ID name of the phone number of the caller who left the voice message or by the name of a contact stored in the captioning device 106 that matches the phone number of the caller. Also, the voice messages 224 and 228 are highlighted to indicate that they have not yet been played back, while the voice messages 222, 226, and 230 are not highlighted to indicate that they have already been played back.

After and in response to selection of the voice message 226 on the screen 220 of FIG. 2A, the visual display 120 of the captioning device 106 of FIG. 1 may transition from the screen 220 of FIG. 2A to the screen 240 of FIG. 2B. For example, the voice message 226 may be selected by the user touching the voice message 226 of the screen 220 of FIG. 2A on the visual display 120 where the visual display 120 is a touchscreen visual display. At least portions of the screen 240 may appear during an automatic delay of the playback of the voice message 226. For example, during the automatic delay of the playback of the voice message 226, the screen 240 may include a message 242 notifying the hearing-impaired user 112 of the automatic delay and/or a message 244 notifying the hearing-impaired user 112 of the origin of the voice message 226 and/or a message 246 notifying the hearing-impaired user 112 of the date and the time that the voice message 226 was created. Further, after establishment of the connection between the captioning device 106 and the remote call assistant 114 of FIG. 1, the screen 240 may include a message 248 notifying the hearing-impaired user 112 of the identity of the remote call assistant 114.

After and in response to establishment of the connection between the captioning device 106 and the remote call assistant 114 of FIG. 1, the visual display 120 of the captioning device 106 of FIG. 1 may transition from the screen 240 of FIG. 2B to the screen 260 of FIG. 2C. The screen 260 may display captioning 262 of the voice message 226 from the very beginning of the playback of the voice message 226, as provided in real-time by the remote call assistant 114 during the playback of the voice message 226 on the captioning device 106 of FIG. 1.

As noted previously, the display of the screen 240 of FIG. 2B during an automatic delay in the playback of the voice message 226 until an establishment of a connection between the captioning device 106 and the remote call assistant 114 may allow the remote call assistant 114 to caption, in real-time, the voice message 226 on the screen 260 of FIG. 2C from the very beginning of the playback of the voice message 226. In this manner, the hearing-impaired user 112 may avoid the captioning 262 on the screen 260 of FIG. 2C from missing information contained in the beginning portion of the voice message 226.

Figure 3:
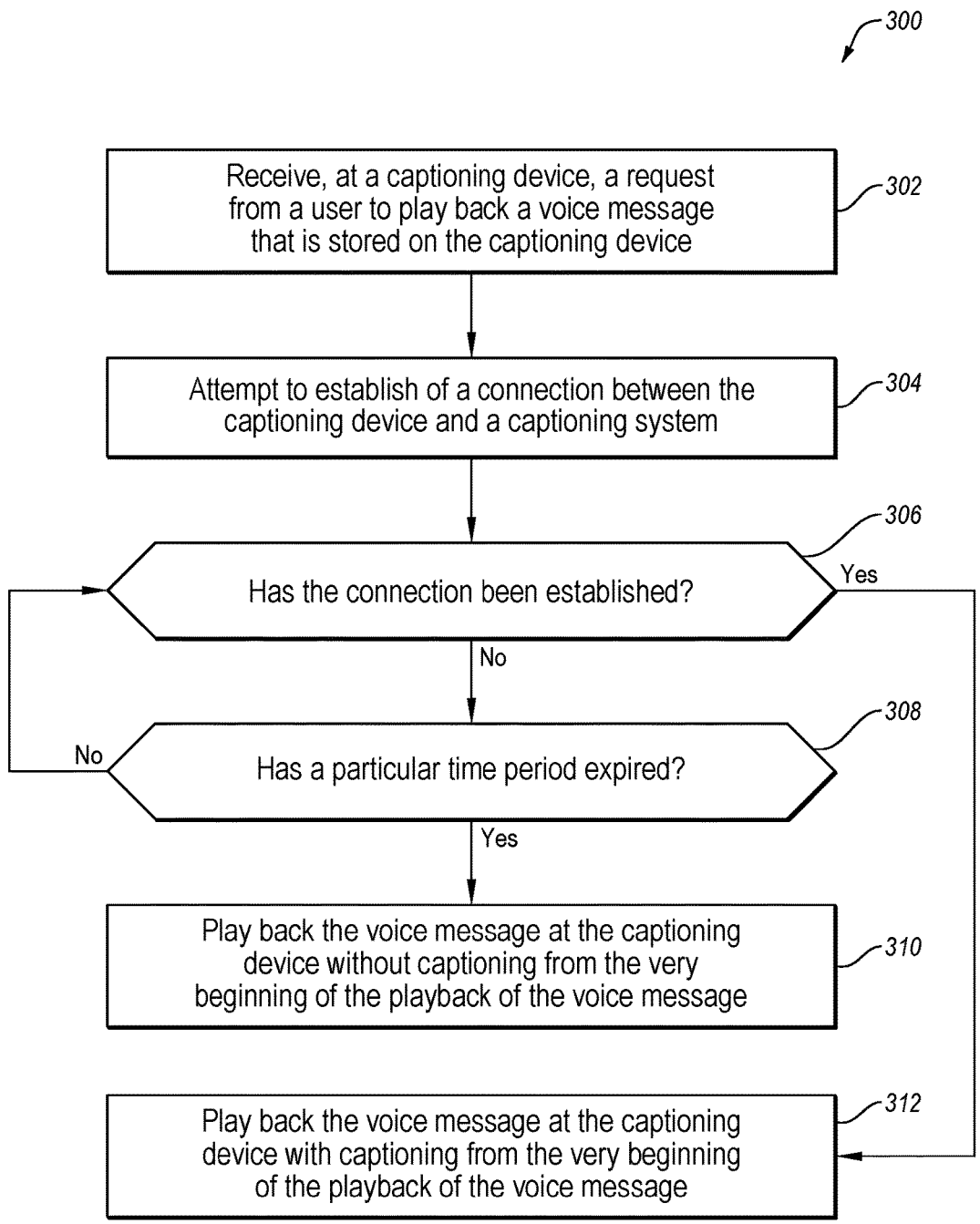
FIG. 3 is a flowchart of an example method for automatically delaying playback of a voice message at a captioning device.

FIG. 3 is a flowchart of an example method 300 for automatically delaying playback of a voice message at a captioning device. The method 300 may be arranged in accordance with at least one embodiment described in the present disclosure. The method 300 may be performed, in some embodiments, by a device or system, such as the devices 104 and 106, or another device. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation. The method 300 will now be described in connection with FIGS. 1, 2A-2C, and 3.

The method 300 may begin at block 302, where a captioning device may receive a request from a user to play back a voice message that is stored on the captioning device. In some embodiments, the request from the user may be received at the captioning device as a result of the user selecting the voice message on a visual display of the captioning device. For example, the hearing-impaired user 112 of FIG. 1 may, at block 302, select the voice message 226 on the screen 220 of FIG. 2A on the visual display 120 of the captioning device 106 of FIG. 1.

At block 304, an attempt may be made to establish a connection between the captioning device and a captioning system. For example, the captioning device 106 of FIG. 1 may attempt to connect to the captioning system 108. For example, this attempt to connect to the captioning system 108 may include connecting to the remote call assistant 114 via the network 102 and the captioning system 108. Alternatively, this attempt to connect to the captioning system 108 may include connecting to an automated speech-to-text system of the captioning system 108.

At decision block 306, it may be determined whether the connection has been established. If not (No at decision block 306), at decision block 308, it may be determined whether a particular time period has expired. In some embodiments, the particular time period may be between about one second and about ten or twenty seconds in duration. In other embodiments, the particular time period may be between about one second and about five seconds in duration. In other embodiments, the particular time period may be between about two seconds and about four seconds in duration. In other embodiments, the particular time period may be about three seconds in duration. If the particular time period has not expired (No at decision block 308), the method 300 may return to decision block 306. If the particular time period has expired (Yes at decision block 308), at block 310, the voice message may be played back at the captioning device without captioning from the very beginning of the playback of the voice message.

For example, if, at decision block 306, it is determined that the connection between the captioning device 106 and the remote call assistant 114 via the network 102 and the captioning system 108 of FIG. 1 has not yet been established but, at decision block 308, a particular time period of three seconds has expired since the hearing-impaired user 112 requested playback of the voice message 226, at block 310 the captioning device 106 may playback the voice message 226 without captioning from the very beginning of the playback of the voice message 226 appearing on the screen 260 of FIG. 2C in order to avoid delaying the playback of the voice message 226 longer than the particular time period of three seconds. For example, if the remote call assistant 114 is not available, it may be better to simply play back the voice message 226 without captioning rather than delay indefinitely the playback of the voice message 226.

Returning now to decision block 306, if it is determined that the connection has been established (Yes at decision block 306), at block 312 the voice message may be played back at the captioning device with captioning from the very beginning of the playback of the voice message. For example, if, at decision block 306, it is determined that the connection between the captioning device 106 and the remote call assistant 114 (via the network 102 and the captioning system 108) of FIG. 1 has been established, at block 312 the captioning device 106 may play back the voice message 226 with captioning from the very beginning of the playback of the voice message 226 appearing on the screen 260 of FIG. 2C. This may avoid the captioning 262 that appears on the screen 260 of FIG. 2C from missing information contained in the beginning portion of the voice message 226.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the decision block 306 may be modified on No (No at decision block 306) to loop back to the decision block 306 and the blocks 308 and 310 may be eliminated. In these embodiments, the playback of the voice message at block 312 may be delayed indefinitely until the connection is established between the captioning device and the remote call assistant, thus ensuring that the remote call assistant is always able to caption, in real-time, the voice message from the very beginning of the playback of the voice message. In other embodiments, the blocks 306 and 312 may be eliminated, and the block 304 may progress directly to the decision block 308. In these embodiments, the playback of the voice message at block 310 will always be delayed for the particular time period and may be useful, for example, where the likelihood is high that the connection between the captioning device and the remote call assistant will successfully be established within the particular time period. While these embodiments may not ensure that the remote call assistant is always able to caption, in real-time, the voice message from the very beginning of the playback of the voice message, they may work reasonably well where the reliability of the connection being successfully established within the particular time period is relatively high. In other embodiments, the playback of a voice message during the method 300 may be replaced by the playback of any type of audio recording, such as a video message that includes both audio and video (such as a recording of a Skype® session), a recording captured by a microphone during a live event, or a recording from a voice recorder. In these embodiments, the same blocks of the method 300, or variations on the blocks discussed above, may be employed to caption, in real-time, the audio recording.

Further, it is understood that the method 300 may improve the functioning of a captioning device. For example, the functioning of the captioning device 106 of FIG. 1 may itself be improved by the method 300 at least because the captioning device 106 may be configured to delay playback of a voice message at the captioning device 106. For example the method 300 may be employed to automatically delay playback of the voice message 226 of FIG. 2B at the captioning device 106 of FIG. 1 in order to help or allow the remote call assistant 114 to caption, in real-time, the voice message 226 on the screen 260 of FIG. 2C of the captioning device 106 from the very beginning of the playback of the voice message 226. In this manner, the hearing-impaired user 112 may automatically avoid the captioning 262 on the screen 260 of FIG. 2C from missing information contained in the beginning portion of the voice message 226, unlike some known captioning devices which begin playback of a voice message prior to establishing a connection with a remote call assistant, resulting in the beginning portion of the voice message not being captioned by the remote call assistant.

Also, the method 300 may improve the technical field of telecommunications. For example, the technical field of telecommunications may be improved by the method 300 at least because some known captioning devices do not enable automatically delaying of playback of a voice message in order to give time for the connection between the captioning device and a remote call assistant to be established. The automatic delay of playing back a locally stored voice message until the connection between the captioning device and a remote call assistant is established may avoid the captioning of the voice message from missing the beginning portion of the voice message.

Figure 4:
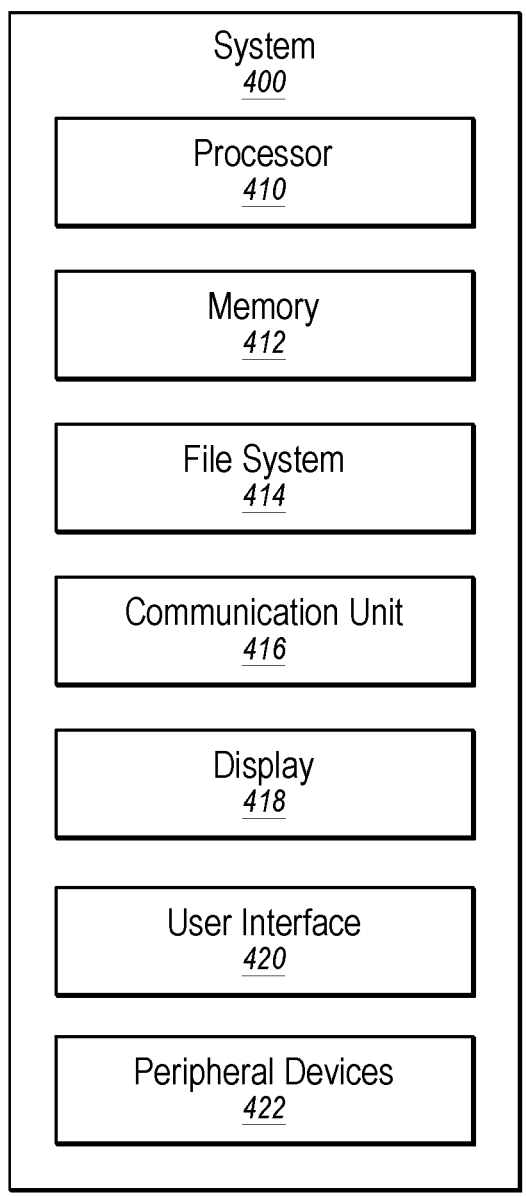
FIG. 4 illustrates an example computing system that may be used in automatically delaying playback of a voice message at a captioning device.

FIG. 4 illustrates an example system 400 that may be used in automatically delaying playback of a voice message at a captioning device. The system 400 may be arranged in accordance with at least one embodiment described in the present disclosure. The system 400 may include a processor 410, a memory 412, a file system 414, a communication unit 416, a display 418, a user interface unit 420, and peripheral devices 422, which all may be communicatively coupled. In some embodiments, the system 400 may be part of any of the systems or devices described in this disclosure. For example, the system 400 may be part of any of the devices 104 or 106 or the captioning system 108 of FIG. 1.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412, the file system 414, or the memory 412 and the file system 414. In some embodiments, the processor 410 may fetch program instructions from the file system 414 and load the program instructions into the memory 412.

After the program instructions are loaded into the memory 412, the processor 410 may execute the program instructions. For example, the system 400 may be part of the device 104, the captioning device 106, or the captioning system 108 of FIG. 1. In these and other embodiments, the instructions may include the processor 410 automatically delaying playback of a voice message at a captioning device.

The memory 412 and the file system 414 may include computer-readable storage media for carrying or having computer-executable instructions or data structures stored thereon. Such computer-readable storage media may be any available media that may be accessed by a general-purpose or special-purpose computer, such as the processor 410. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations, such as one or more blocks of the method 300.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), plain old telephone service (POTS), and/or the like. The communication unit 416 may permit data to be exchanged with a network and/or any other devices or systems described in the present disclosure.

The display 418 may be configured as one or more displays, like an LCD, LED, or other type display. The display 418 may be configured to present video, text captions, user interfaces, and other data as directed by the processor 410.

The user interface unit 420 may include any device to allow a user to interface with the system 400. For example, the user interface unit 420 may include a mouse, a track pad, a keyboard, a touchscreen, a telephone switch hook, volume controls, other buttons, and/or a telephone keypad, among other devices. The user interface unit 420 may receive input from a user and provide the input to the processor 410.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture digital images. The digital images may be captured in a manner to produce video or image data. In some embodiments, the speaker may broadcast audio received by the system 400 or otherwise generated by the system 400.

Modifications, additions, or omissions may be made to the system 400 without departing from the scope of the present disclosure.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 412 or file system 414 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A captioning device comprising:
a display;
a speaker;
a processor communicatively coupled to the display and to the speaker; and
at least one non-transitory computer-readable media communicatively coupled to the processor and configured to store one or more instructions that when executed by the processor cause performance of operations comprising:
    receiving, at the captioning device, a request from a user to playback, on the speaker, audio of a voice message that is stored on the at least one non-transitory computer-readable media;
    automatically delaying, at the captioning device, the playback of the audio of the voice message, by the speaker, until the earlier of:
        an establishment of a connection between the captioning device and a remote call assistant, in order to allow the remote call assistant to receive the audio of the voice message from the very beginning of the playback of the audio of the voice message; and
        an expiration of a particular time period even if no connection is established between the captioning device and the remote call assistant, in order to avoid delaying the playback of the voice message longer than the particular time period;
    providing the audio of the voice message to the remote call assistant at a captioning system over a network;
    obtaining, over the network, captions generated by the captioning system using the audio of the voice message; and
    presenting the captions on the display concurrently with the playback of the audio of the voice message by the speaker.

2. The captioning device of claim 1, wherein:
the display is a touchscreen visual display; and
the request from the user is received at the captioning device as a result of the user selecting the voice message on the touchscreen visual display.

3. The captioning device of claim 1, wherein the operations further comprise:
during the automatic delay of the playback of the audio of the voice message, displaying, on the display, a message notifying the user of the automatic delay.

4. The captioning device of claim 1, wherein operations further comprise:
after the establishment of the connection between the captioning device and the remote call assistant, displaying, on the display, a message notifying the user of an identity of the remote call assistant.

5. The captioning device of claim 1, wherein the particular time period is between about one second and about five seconds in duration.

6. The captioning device of claim 1, wherein the particular time period is about three seconds in duration.

7. The captioning device of claim 1, wherein operations further comprise perform:
during the automatic delay of the playback of the voice message, displaying, on the display, a message notifying the user of an origin of the voice message and a message notifying the user of a date and a time that the voice message was created.

8. A method for automatically delaying playback of a voice message at a captioning device, the method comprising:
receiving, at a captioning device, a request from a user to playback audio of a voice message that is stored on the captioning device;
automatically delaying the playback of the audio of the voice message, at the captioning device, until the earlier of:
    an establishment of a connection between the captioning device and a remote call assistant, in order to allow the remote call assistant to receive the audio of the voice message from the very beginning of the audio of the playback of the voice message; and
    an expiration of a particular time period even if no connection is established between the captioning device and the remote call assistant, in order to avoid delaying the playback of the voice message longer than the particular time period;
providing the audio of the voice message to the remote call assistant at a captioning system over a network;
obtaining, over the network, captions generated by the captioning system using the audio of the voice message; and
presenting, by the captioning device, the captions concurrently with the playback of the audio of the voice message.

9. The method of claim 8, wherein:
the captioning device includes a display; and
the request from the user is received at the captioning device as a result of the user selecting the voice message on the display.

10. The method of claim 9, further comprising:
during the automatic delay of the playback of the audio of the voice message, displaying, on the display, a message notifying the user of the automatic delay.

11. The method of claim 10, further comprising:
during the automatic delay of the playback of the audio of the voice message, displaying, on the display, a message notifying the user of an origin of the voice message and a message notifying the user of a date and a time that the voice message was created; and
after the establishment of the connection between the captioning device and the remote call assistant, displaying, on the display, a message notifying the user of an identity of the remote call assistant.

12. The method of claim 8, wherein the particular time period is between about two seconds and about four seconds in duration.

13. The method of claim 8, wherein the particular time period is about three seconds in duration.

14. One or more non-transitory computer readable media configured to store one or more instructions that when executed by one or more computing systems cause performance of the method of claim 8.

15. A method for automatically delaying playback of a voice message at a captioning device, the method comprising:
   receiving, at a captioning device, a request from a user to playback audio of a voice message that is stored on the captioning device;
   in response to the request from the user, automatically delaying the playback of the audio of the voice message, at the captioning device, until an establishment of a connection between the captioning device and a remote call assistant, in order to allow the remote call assistant to receive the audio of the voice message from the very beginning of the playback of the audio of the voice message;
   providing the audio of the voice message to the remote call assistant at a captioning system over a network;
   obtaining, over the network, captions generated by the captioning system using the audio of the voice message; and
   presenting, by the captioning device, the captions concurrently with the playback of the audio of the voice message.

16. The method of claim 15, wherein:
   the captioning device includes a touchscreen display; and
   the request from the user is received at the captioning device as a result of the user selecting the voice message on the touchscreen display.

17. The method of claim 16, further comprising:
   during the automatic delay of the playback of the audio of the voice message, displaying, on the display, a message notifying the user of the automatic delay.

18. The method of claim 15, further comprising:
   during the automatic delay of the playback of the audio of the voice message, displaying, on the display, a message notifying the user of an origin of the voice message and a message notifying the user of a date and a time that the voice message was created.

19. The method of claim 15, further comprising:
   after the establishment of the connection between the captioning device and the remote call assistant, displaying, on the display, a message notifying the user of an identity of the remote call assistant.

20. One or more non-transitory computer readable media configured to store one or more instructions that when executed by one or more computing systems cause performance of the method of claim 15.

* * * * *